Feb. 10, 1925.
O. B. GENTRY
RAKE
Filed Aug. 1, 1922
1,525,580
3 Sheets-Sheet 1
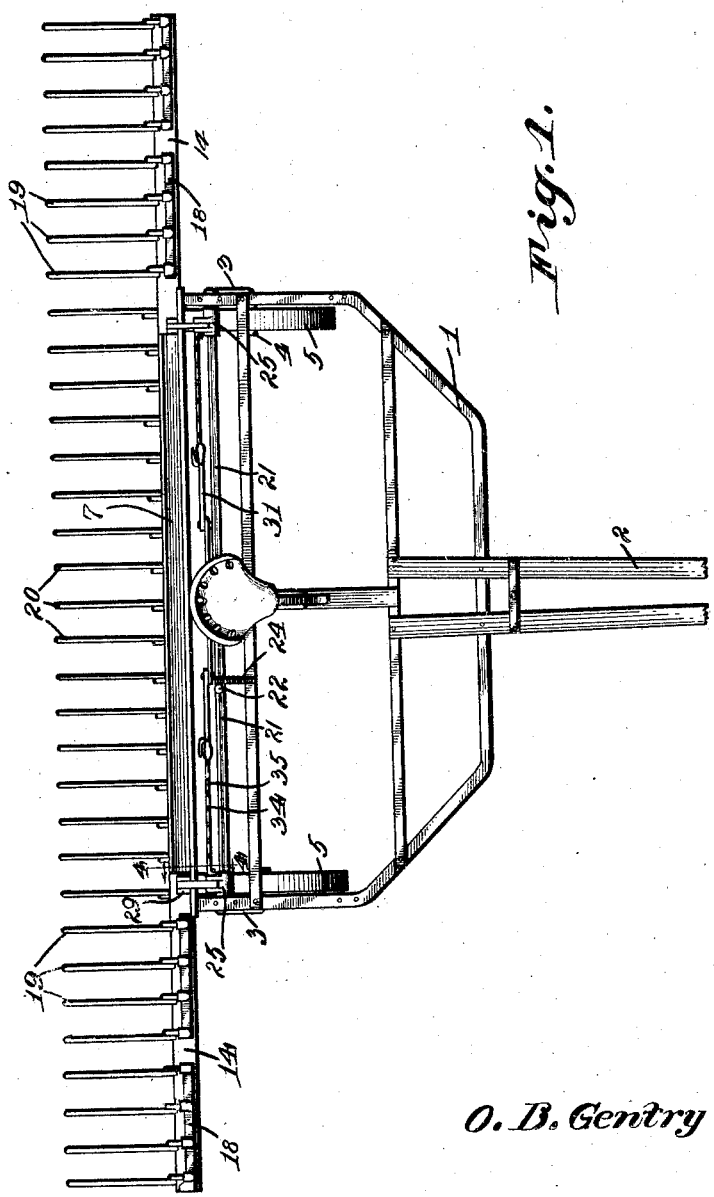
O. B. Gentry
Inventor

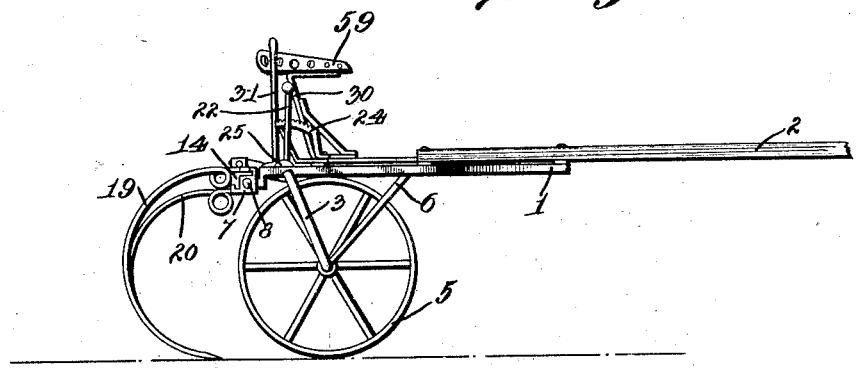
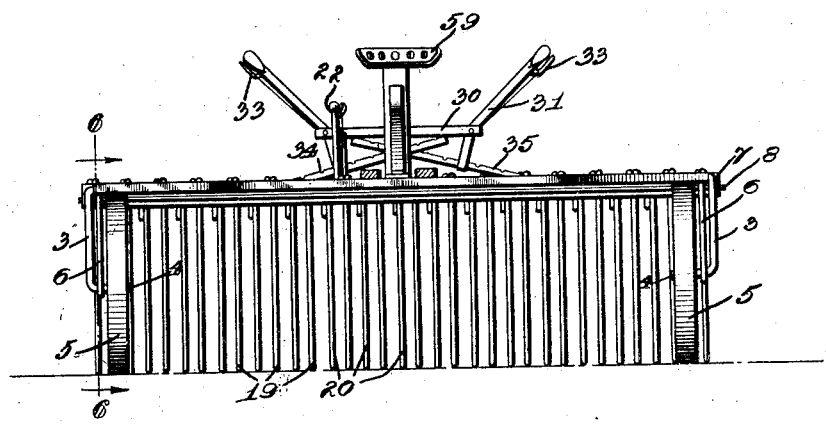
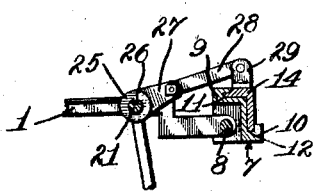

O. B. Gentry
Inventor

Patented Feb. 10, 1925.

1,525,580

UNITED STATES PATENT OFFICE.

ORA BARLOW GENTRY, OF GLASGOW, KENTUCKY.

RAKE.

Application filed August 1, 1922. Serial No. 579,076.

*To all whom it may concern:*

Be it known that I, ORA BARLOW GENTRY, a citizen of the United States, residing at Glasgow, in the county of Barren and State of Kentucky, have invented a new and useful Rake, of which the following is a specification.

The device forming the subject matter of this invention is a rake of that general type in which two sections of teeth are laterally adjustable with respect to a fixed central section of teeth, the construction of the machine being such that the area swept by the rake may be adjusted.

The invention aims to provide novel means for mounting the lateral sections of teeth for sliding movement, and to provide novel means for moving all of the teeth vertically with respect to the ground.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed changes in the precise embodiment of the invention shown can be made without departing from the spirit of the invention.

In the accompanying drawings:—

Figure 5:
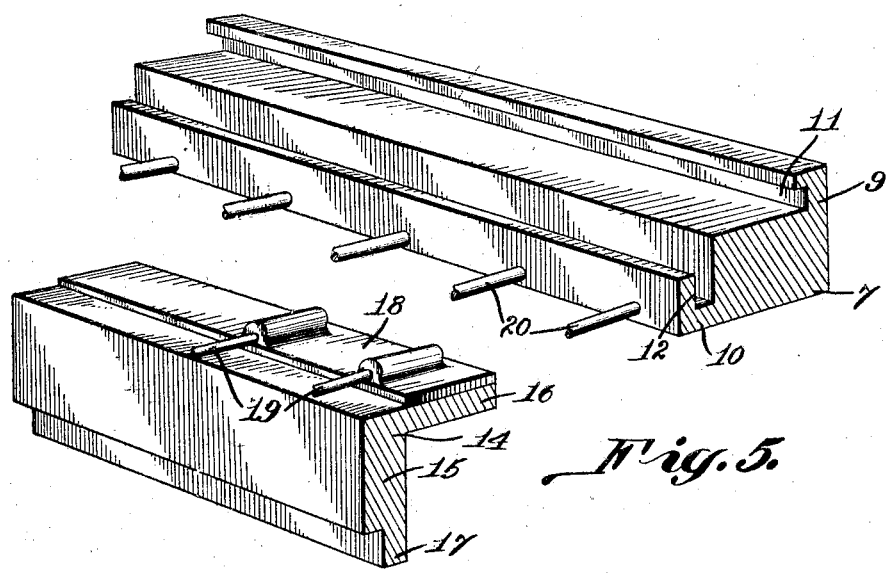
Figures 6, 7:
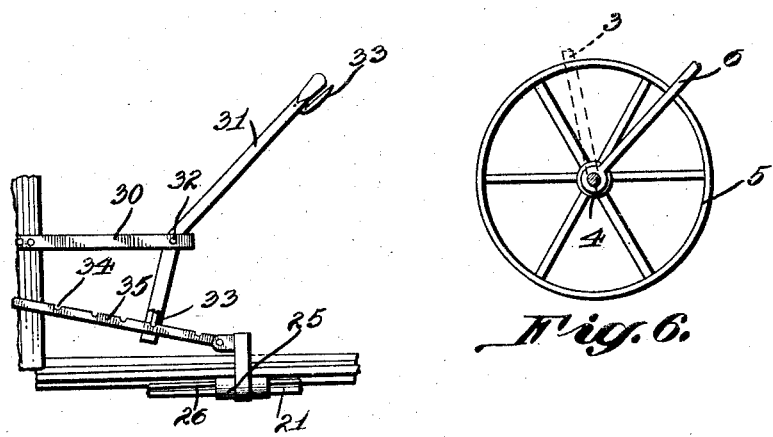

Figure 1 shows in plan, a device constructed in accordance with the invention; Figure 2 is a side elevation; Figure 3 is an end elevation; Figure 4 is a sectional detail showing the means whereby a rocking movement is imparted to certain parts, to raise and lower the teeth with respect to the surface of the soil; Figure 5 is a perspective view showing the support and one of the slides disassembled; Figure 6 is a fragmental section on the line 6—6 of Figure 3; Figure 7 is a fragmental elevation showing the means whereby the slides which carry the laterally adjustable teeth are moved inwardly and outwardly.

In carrying out the invention, there is provided a frame 1 carrying a draft tongue 2 or any suitable means whereby the machine may be advanced. A seat 59 is mounted on the frame 1. Hangers 3 depend from the frame 1 and are supplied with inwardly extended ends 4 whereon ground wheels 5 are journaled, braces 6 extending between the ends 4 of the hangers 3 and the frame 1.

A transverse support 7 is mounted on the rear portion of the frame 1 and constitutes means for carrying the relatively fixed central section of teeth, marked by the numeral 20. The support 7 is pivoted at 8 at its ends, in the side portions of the frame 1, so that the support may rock about a horizontal axis. The support 7 has an upstanding flange 9 and a horizontal flange 10, there being a horizontal groove 11 in the flange 9 and there being a vertical groove 12 in the flange 10. Slides 14, in the form of angle members, are mounted to reciprocate on the support 7, each slide 14 including a wing 15 and a wing 16 located at right angles to the wing 15. The wing 16 slides in the guide groove 11, the wing 15 being supplied with a reduced lip 17 received slidably in the guide groove 12. The wings 16 of the slides 14 carry plates 18 provided with teeth 19, although the teeth may be mounted in any desired way on the member 14. The construction, obviously, is such that the slides 14 may be moved inwardly and outwardly, transversely of the draft line, thereby enabling the teeth 19 to sweep an area of greater or less extent, the teeth 20 on the support, covering the space that exists between the teeth 19 of the slides 14, when the slides 14 are moved outwardly in opposite directions.

A shaft 21 is mounted at its ends to rock in the side portions of the frame 1. The shaft 21 carries a lever 22 whereby rocking movement may be imparted to the shaft, the lever having a latch mechanism adapted to cooperate with a segment 24 on the frame 1 to hold the lever in adjusted positions. Riders 25 are splined at 26 to the shaft 21 for sliding movement longitudinally of the shaft, the construction being such that when the shaft is rotated, the riders will be rotated also. The riders 25 have projecting arms 27 connected by pivoted links 28 with brackets 29 on the slides 14.

A support 30 is carried by the frame 1, the support being mounted on the seat 59 or elsewhere. Levers 31 are fulcrumed intermediate their ends, as at 32 on the support 30. The outer ends of links 35 are pivoted for free swinging movement on the riders 25. The links 35 are loosely supported for sliding movement in the levers 31 and have seats 34 adapted to be engaged by latch mechanisms 33 on the levers 31.

In practical operation, through the instrumentality of the levers 31 and the links 35, the riders 25 may be moved inwardly and outwardly on the shaft 21 and when the riders move inwardly and outwardly, the slides 14 and the teeth 19 thereon will be carried inwardly and outwardly, since the riders are connected to the slides by the links 28. Through the instrumentality of the lever 22, the shaft 21 may be rocked and then the links 28 will cause the support 7 to swing on a horizontal axis passing through its pivotal mountings 8 through the medium of the members 14, it being possible, in this way, to raise the teeth 20 and 19 with respect to the surface of the ground.

What is claimed is:—

1. In a device of the class described, a frame, a support mounted to swing about a horizontal axis on the frame, the support being provided adjacent to its forward edge with an upstanding flange having a substantially horizontal guide groove, the support being supplied upon its rear edge with a rearwardly extended flange having a substantially vertical guide groove, slides in the form of angle members, the slides being engaged with the support and being received slidably at their edges in the guide grooves, teeth carried by the slides, teeth carried by the support, and means under the control of an operator, for moving the slides toward and away from each other.

2. In a device of the class described, a frame; a support mounted to rock on the frame; teeth carried by the support; slides mounted to reciprocate on the support; teeth carried by the slides; a shaft mounted to rock in the frame; means for imparting rocking movement to the shaft; riders slidable along the shaft and connected with the shaft to swing, when the shaft is rocked; means for sliding the riders longitudinally of the shaft; and connections between the riders and the slides.

3. In a device of the class described, a frame; a support mounted to rock on the frame; teeth on the support; slides mounted for reciprocation on the support; teeth carried by the slides; a shaft mounted to rock in the frame; mechanism under the control of an operator for rocking the shaft; riders mounted for reciprocation on the shaft and connected to the shaft to swing, when the shaft is rotated; means for connecting the riders with the slides; levers carried by the frame; and links connecting the levers with the riders to secure a reciprocation of the riders on the shaft.

In testimony that I claim the foregoing as my own, I have hereto affixed my signature.

ORA BARLOW GENTRY.